June 10, 1947.  J. L. BETZEN  2,422,071
TURNING LATHE
Filed July 8, 1944  4 Sheets-Sheet 2
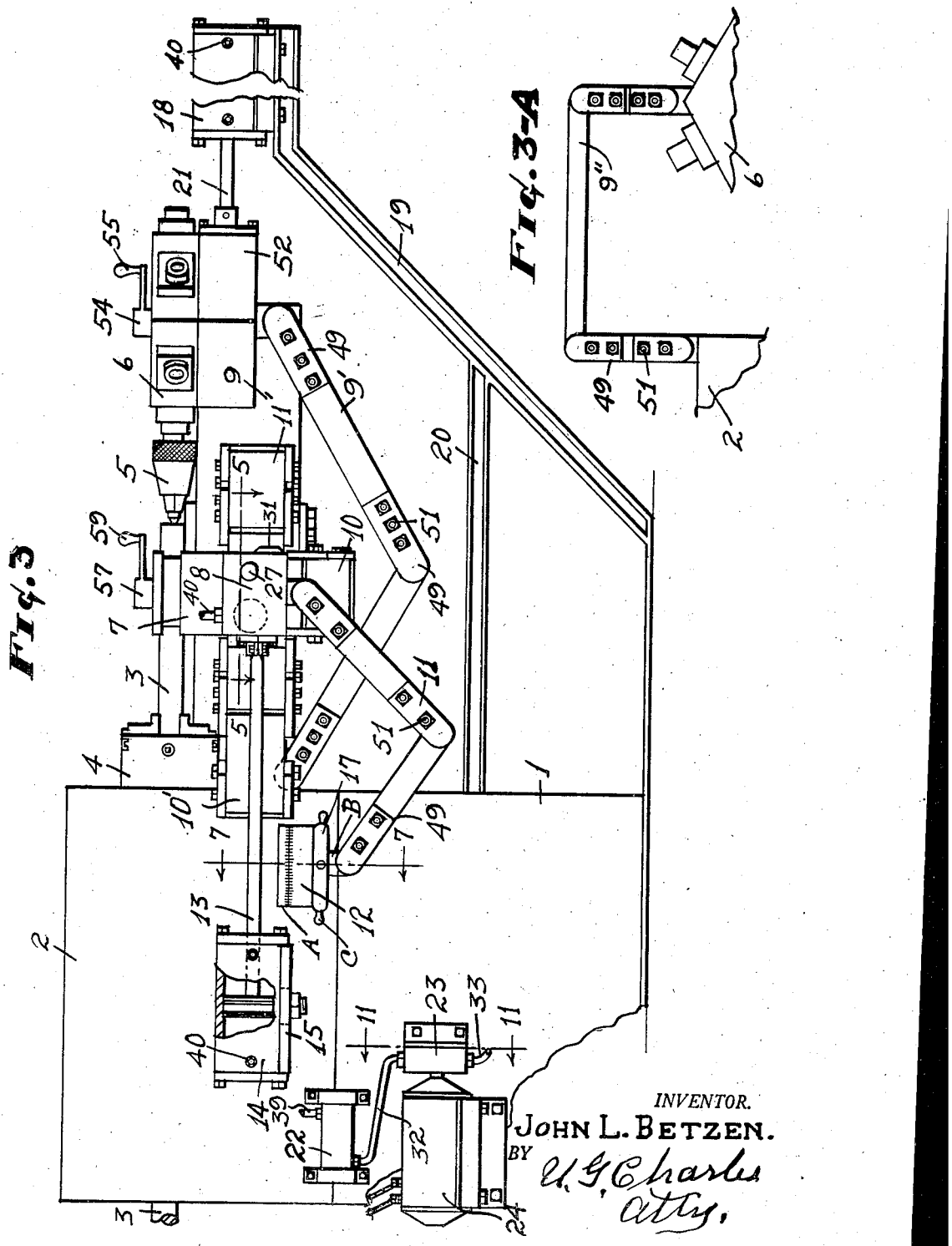
INVENTOR.
JOHN L. BETZEN.
BY U.G. Charles
atty.

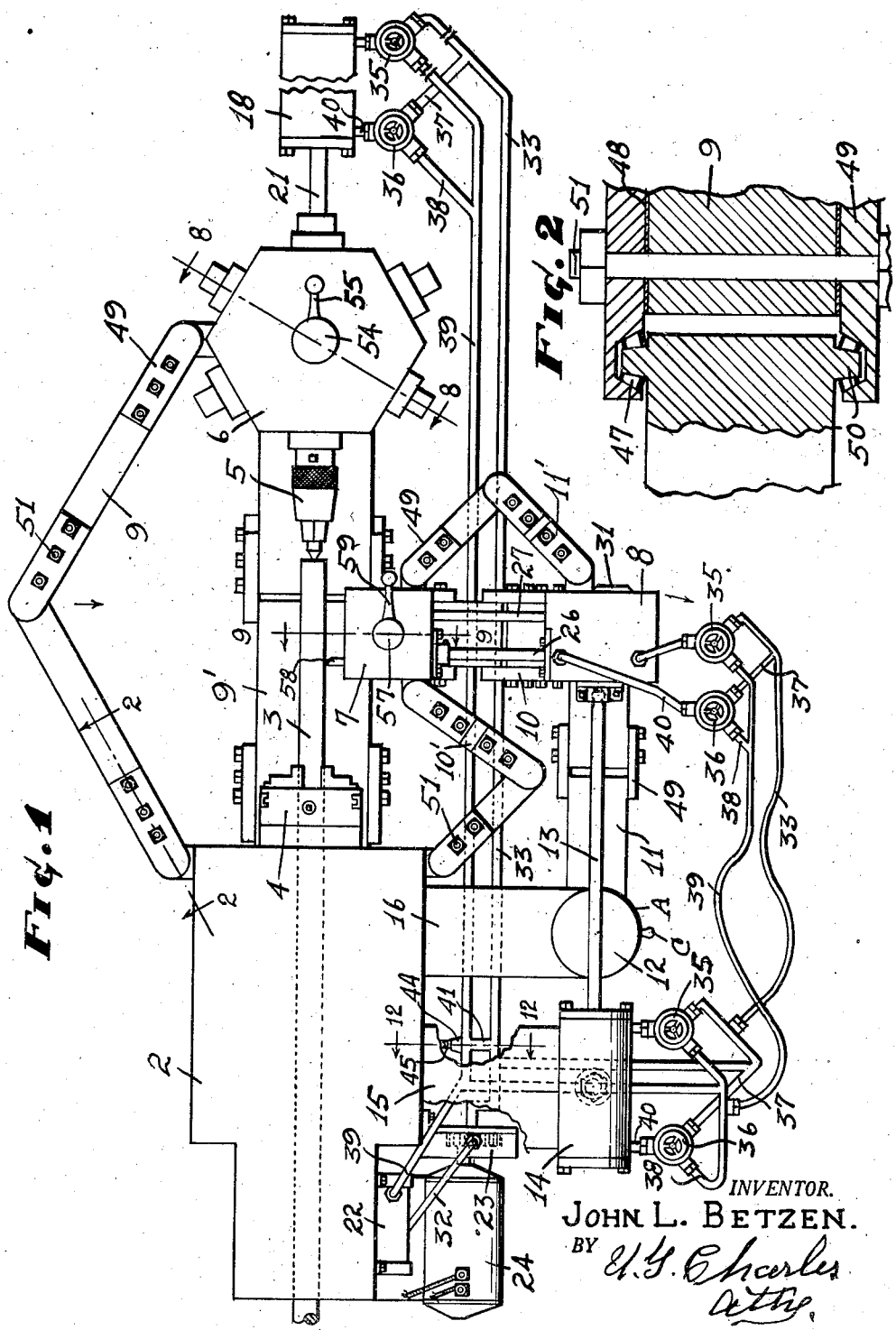

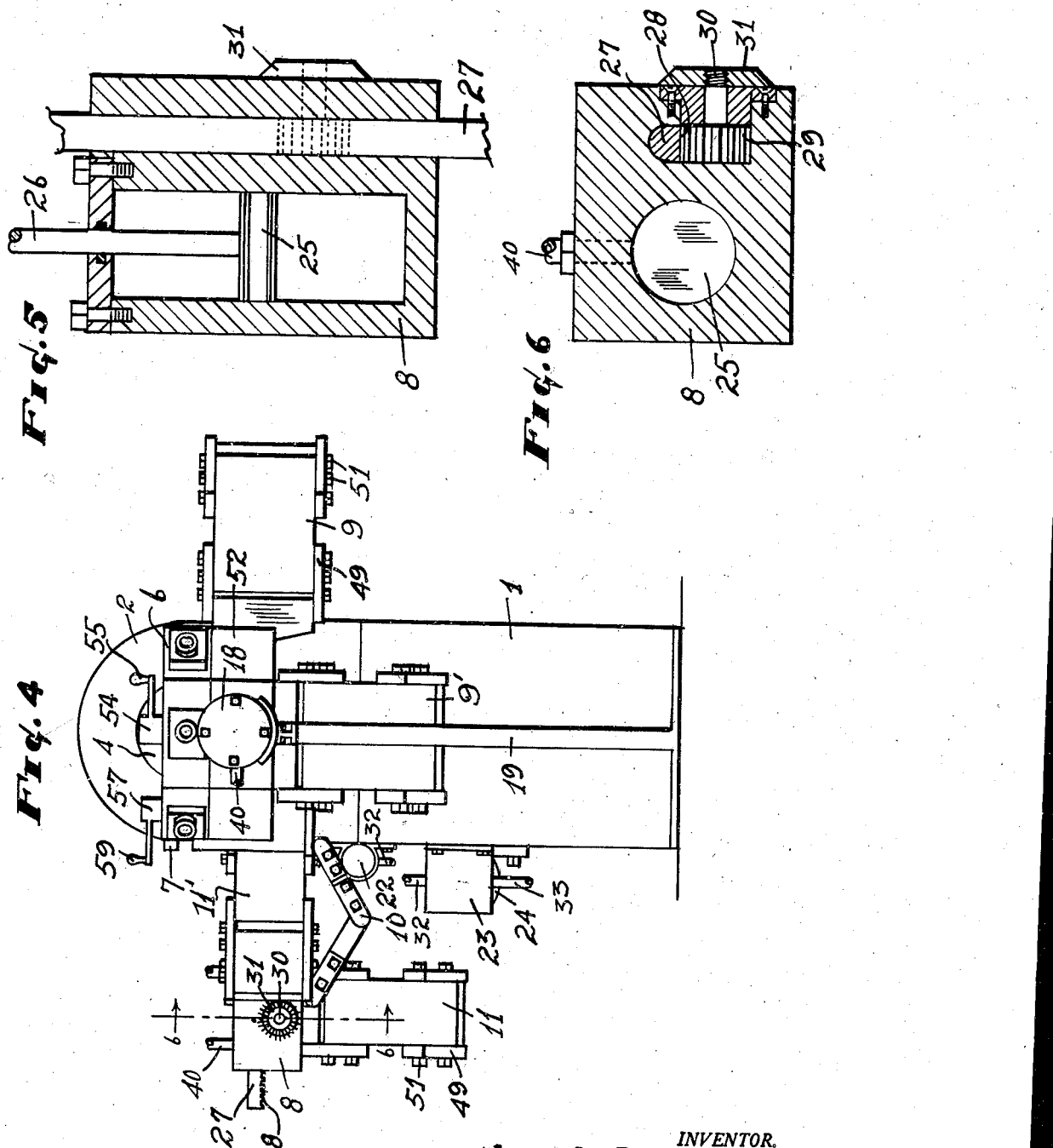

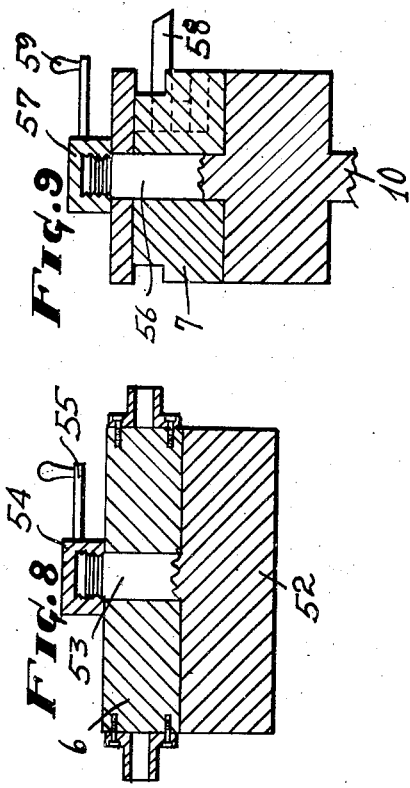
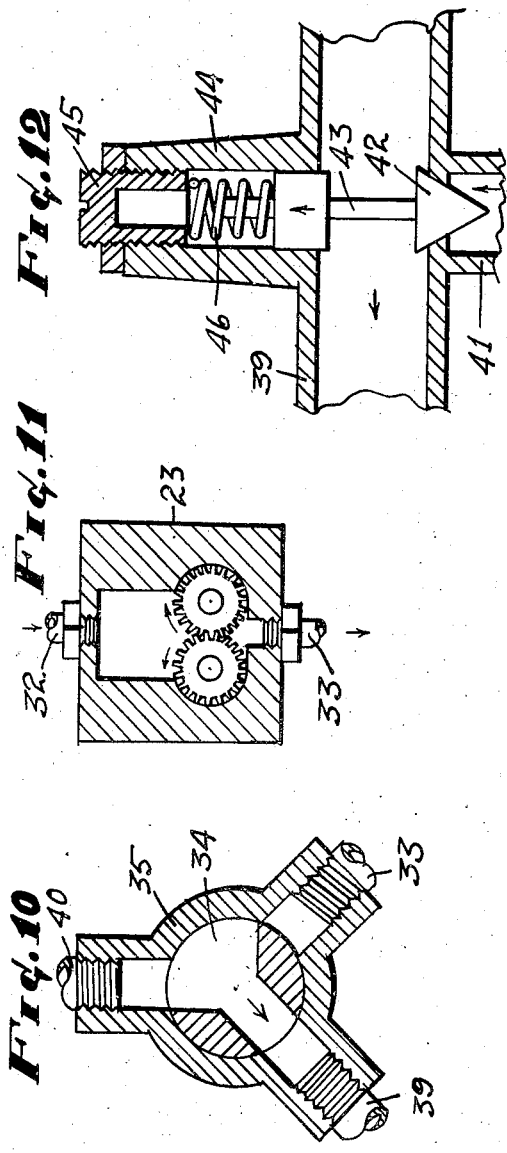
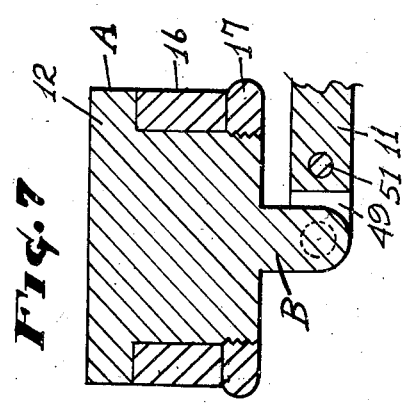
INVENTOR.
JOHN L. BETZEN.
BY

Patented June 10, 1947

2,422,071

UNITED STATES PATENT OFFICE 2,422,071

TURNING LATHE

John L. Betzen, Wichita, Kans.

Application July 8, 1944, Serial No. 544,019

1 Claim. (Cl. 29—42)

This invention relates to improvements in turning lathes and has for its principal object the elimination of a conventional bed as a conductor for the cutting tool carriage and tail stock. While in this invention the same are carried floatingly by hinges, whereby a comparatively large portion of material and expensive machine labor is eliminated.

A further object of this invention is to hydraulically operate the cutting tool head for its accurate position upon the work, and to vary the position by power actuated means.

A still further object of this invention is to construct a turning lathe in such a way as to economize floor space for its installation in a factory.

These and other objects will herein after be more fully explained, reference being had to the accompanying drawings forming a part of this specification, and in which like characters will apply to like parts in the different views, and the said turning lathe hereinafter referred to as lathe.

Referring to the drawings:

Fig. 1 is a plan view of the lathe.

Fig. 2 is an enlarged sectional view taken on line 2—2 in Fig. 1.

Fig. 3 is a side view of the lathe.

Fig. 3A is a modification for the hinge members.

Fig. 4 is an end view of the lathe.

Fig. 5 is an enlarged cross section of the cylinder taken on line 5—5 in Fig. 3.

Fig. 6 is an enlarged sectional view taken on line 6—6 in Fig. 4.

Fig. 7 is an enlarged sectional view taken on line 7—7 in Fig. 3.

Fig. 8 is an enlarged sectional view taken on line 8—8 in Fig. 1.

Fig. 9 is an enlarged sectional view taken on line 9—9 in Fig. 1.

Fig. 10 is an enlarged sectional view through the hydraulic valves.

Fig. 11 is an enlarged section through the pump taken on line 11—11 in Fig. 3.

Fig. 12 is an enlarged sectional view through the bypass valve taken on line 12—12 in Fig. 1.

The invention herein disclosed consists of a pedestal 1 as carrying means for the components of the lathe comprising a gear housing 2 mounted on the upper end of the pedestal, said housing having a convention gear ratio journalled therein to turn a shaft or work 3, the gears of the housing not shown in the drawings. Note that the work outwardly extends as shown in Figs. 1 and 3, said work being axially with a chuck 4 and secured therein as turning means for said work 3, one end of which extends outward of the gear housing while the other end portion is pivotally carried by a conventional tail stock 5 engaged by a turret 6.

At one side of the said work is positioned a cutting tool carriage 7 and a power transmitting means 8 carried in working relation to the tool carriage by hinges later described.

It will now be seen that the turret, tool carriage and power actuation for the tool carriage are arranged to float on their respective pair of hinges 9 and 9', 10 and 10', 11 and 11', respectively, and the hinges of each pair being transversely applied to each other for rectilinear movement, except the pair of hinges 11 and 11' in which one end of hinge 11 is rockably secured to a horizontal rocking element 12 to carry the outer end of the carriage actuator on an arc as shown by an arrow whereby the tool carriage is slantingly positioned with respect to the turning axis of the work carried by the lathe, and a piston rod 13 and its cylinder 14 will likewise respond to the arcuate movement as the cylinder is pivotedly connected at its longitudinal center to a shelf 15 that is carried by the gear housing, while the other end of the rod 13 has a ball and socket to connect the same to the carriage actuator 8. It will also be seen that the said horizontal rocking element 12 for the hinge 11 consists of a cylindrical member 12 rockably engaged in the outer end of an arm 16 that is secured to the gear ratio housing and the said cylindrical member 12 has a flange A at its upper end to rest on the arm in which the cylinder is rockably engaged, the lower end of which extends outward from the arm and being threaded to engage an annular threaded collar 17 as locking means for the cylinder against rotation when selectively set and the said extension has a lug B to engage the end of the hinge. To turn the collar there is provided a pair of handles C oppositely disposed and pointing outward from the periphery thereof as shown in Figs. 1 and 3.

Positioned rearward of the turret and tail stock is a cylinder 18, the axis of which is downward from the axis of the tail stock but in parallelism therewith, said cylinder being carried by a channel or eye beam 19 secured thereto and angling downward and forward to where it connects to the pedestal and having an intermediate brace member 20 connected thereto and to said pedestal whereby the cylinder is rigidly supported for its function. Said cylinder has a piston rod 21, the outer end of which is attached to the base portion of the turret to move the same toward and from the chuck of the lathe to centrally engage the pivot point of the tail stock with the work, and the said cylinder has pipe connections to operate the same as hereinafter specified.

At the other end of the lathe is an oil tank 22 carried by the pedestal in working relation to a pump 23, and an electrically driven motor 24 to operate the pump, and the said power-actuating means for the cutting tool carriage consists of a body portion 8 being bored to function as a cylinder and having a piston 25 to slide therein reciprocatingly, said piston having a rod 26 outwardly extending and being connected to the tool carriage to move the same toward and from the work carried by the lathe. There is also provided a gauge arrangement consisting of a rod 27 slidably engaging in the said body and being in parallelism with the piston rod, said rod having one end secured to the tool carriage to move therewith reciprocatingly and having on its underside a series of teeth 28 to function as a rack, the teeth being in mesh with a toothed pinion 29 that is journalled in the body portion, the shaft 30 of which extends outward to one side and having on its outer end a dial 31 having graduations marks spaced therearound as shown in Fig. 4. The body adjacent the dial is likewise graduately marked to register with the graduations on the dial whereby the movement of the tool rock may be computed with respect to its distance toward and from the work, and the graduation on both dial and body may be numbered with respect to a fraction of an inch, the numbers not being shown in the drawings, and likewise the angle of the tool carriage and its power actuater may be computed by placing graduations on both the flange of the cylindrical member 12 and the arm in registery with each other so that the degree of rock may be computed.

It will be seen that a pipe system as conductors for hydraulic fluid is illustrated in Fig. 1, showing their relative position in connection with the different cylinders, the analysis of which is as follows:

It will also be seen that the gear pump 23 of a conventional type is employed to circulate the hydraulic fluid, the direction of flow being indicated by arrows in Fig. 11, and as heretofore stated the energy of the pump is actuated by the electric motor as circulating and compressing means for the hydraulic fluid as taken from the tank through a supply pipe 32 and ejecting the same through pipe 33 as shown in Figs. 1, 3, and 11 to energize the movement of the piston in cylinder 18 and to drive the turret toward the chuck so that the tail stock will engage the end of the work adjacent thereto wherein a bypass core 34 in a valve 35 is turned to inject the force of circulation in at the rear end of the cylinder to drive its piston toward the front end and at the same time a similar core in valve 36 is turned to exhaust the pressure from the front end in coaction with the first said valve.

To reverse the movement of the piston, the core in valve 36 is turned to eject its force of power in the forward end of the cylinder and at the same time the core in valve 35 is turned to permit an outward circulation for its end of the cylinder whereby when the tailstock is properly tensioned with the work the piston is retained stationarily, the core of both being turned to seal their respective connections with the cylinder against further circulation.

It will be seen that the pressure line 33 has a lateral 37 capable of communicating with the valve 36 when the other valve is closed. In this instance the form of the core of the valve 36 is capable of closing lateral 38 whereby the piston is moved rearwardly and when moved in the other direction or forward, the core in valve 36 is turned to close lateral 37 so that the pressure exhausts through lateral 38 and its return line 39, and in coaction with its movement valve 35 is turned to close return pipe 39 and permit the pressure pipe 33 to communicate with the outer end of the cylinder and so on to move the piston in a direction selectively, and to the extent required to stationarily support the tail stock. It is true however that the tail stock may be changed to a drill bit carried by the turret to drill the work axially, in this event the drill bit is stationary against rotation while the work is being turned, and the valves just explained being capable of a gradual advance and retraction of the drill bit.

It will be understood that the piston movements in cylinder 14 and cylinder of the block body 8, each have their own respective pair of valves and being operated in like manner to said pair of valves for cylinder 18. To explain the circulation, last said pairs of valves will be numbered as above described and likewise their pressure, exhaust pipes, and laterals and the said pressure and exhaust pipes between said last said pair of valves are flexible as illustrated to accommodate for a predetermined rocked position of the tool carriage and its power transmitting means simultaneously.

To clarify the principle of the valve core and its communicating pipes, it will be seen in Fig. 10, that the core is set for the return pipe while the pressure pipe is closed and the core may be rocked anti-clockwise to close the return and communicate with the intake and pressure line simultaneously, and the pipe system can be closed against circulation by anti-clockwise turn of the core so that the outlet port of the core will be in registery with the solid wall of the valve between the pressure and exhaust pipe connections with the valve, while the connections 40 of the valves with the cylinders remain open but locked against circulation.

When the circulation is locked and the motor driving the pump, excess pressure will be built up, therefor a safety device is placed in the pipe lines in close relation to the pump where the pressure line and the return pipe is connected by a lateral 41 that has a conical valve 42 in the end thereof where it communicates with the return pipe, said valve having a stem 43 secured to a head that fits closely in an outwardly extending stud 44, the outer end of which is closed by a plug 45 threadedly engaging therein to adjust the tension of a coil spring 46 positioned between the end of the plug and head whereby an excess pressure in the pressure line is relieved by opening the conical valve to permit circulation, the pressure maintained for service being controlled by tension of the spring which is free to permit circulation as above stated.

Inasmuch as stability relies upon the hinges heretofore described it will be seen in Fig. 2 that the joints have conical roller bearings 47 and shims 48 to adjust the bearings. Inasmuch as the bearings extend outward from the edge of the hinge there is provided plates 49 having a bearing race formed in the end to receive conical spindles 50 integral with one leaf of the hinge to engage with their respective conical rollers and to make the adjustment above referred to the plates are removably connected by bolts 51 extending through the leaf of the hinges and said plates as shown in Figs. 1 and 2.

In Fig. 8 is shown a body element 52 polygonal in form and having a spindle 53 axially extending upward upon which is seated the turret element, and being secured by a cap 54 internally threaded to engage with the threads of the spindle while the rim of the cap bears upon the body of the turret to bind the same securely, said cap having a handle 55 to turn the cap whereby the turret may be turned so that its connecting elements will axially align with the chuck, and has connections adapted to carry tools of different kinds such as drill bits and tail stocks and the outer ends of hinges 9 and 9' are rockably connected to the body element to carry the same toward and from the chuck by action of its cylinder's piston heretofore described and the hinges adapted to respond to the movement and being the floating means for the turret along the plane of an axis with the chuck.

The tool carriage is of a conventional type as illustrated in Fig. 9, consisting of an element rectangular in cross section that has a spindle 56 extending upward therefrom on which an apertured member will engage and a cap member 57 axially bored to fit on the spindle 56 whereby a clamp is formed for a cutting tool 58 outwardly extending therefrom and being secured by the cap internally threaded and having a handle 59 to turn the same to loosen the tool or lock it at a desired angle with respect to the turning axis of the work.

In Fig. 3A is shown a hinge 9" modified which consists of three members to collapse in like manner to that of the hinges otherwise shown, and other modifications may be employed as lie within the scope of the appended claim.

Having fully described my invention what I claim as new and desire to secure by Letters Patent is:

In turning lathes comprising in combination a pedestal having a gear housing on its upper extremity, and a chuck journalled in the housing, a turret and tail stock in axial alignment with the chuck, a motor actuated hydraulic pump, and an arm carried by the pedestal, said arm being positioned below the turning axis of the chuck and extending outward at right angle therefrom, a cutting tool carriage positioned in working relation to the turning axis of the chuck, and a leaf hinge to carry the cutting tool carriage in its movement toward and from the turning axis, one leaf of the hinge being rockably secured to the pedestal, the other leaf being rockably secured to one vertical side of the said cutting tool carriage, a power transmitter for the cutting tool carriage outwardly positioned and aligned therewith on a horizontal plain, said power transmitter comprising a cylinder and piston rod, a gear rack and registering means for the gear, said rack and piston rod being secured to the cutting tool carriage, the rod to move the same toward and from the said turning axis of the chuck, a pair of leaf hinges rockably secured to their respective lower and vertical sides of the power transmitter and cutting tool carriage to maintain horizontal alignment thereof as the latter is moved toward and from said turning axis, the hydraulic pump as actuating means for the piston rod while the rack's pinion will register a degree of movement of the cutting tool carriage, a leaf hinge having one of its ends secured to the under side of the power transmitter in such a way as to rock on a horizontal plain, while its other end is rockably carried on the outer end of said arm for vertical movement and also for a degree of movement on a horizontal plain selectively, and means to secure the same rigid against further movement.

JOHN L. BETZEN.

REFERENCES CITED

The following references are of record in the file of this patent:

UNITED STATES PATENTS

| Number | Name | Date |
|---|---|---|
| 1,874,266 | Ferris | Aug. 30, 1932 |
| 2,007,563 | De Koning | July 9, 1935 |
| 1,638,086 | Carter | Aug. 9, 1927 |